United States Patent [19]

Jäger et al.

[11] Patent Number: 5,588,795
[45] Date of Patent: Dec. 31, 1996

[54] HANDLING APPARATUS

[75] Inventors: Helmut F. Jäger, Königsbach-Stein; Jürgen Peschina, Knittlingen, both of Germany; Bernard Dietrich, Rixheim, France

[73] Assignee: Felsomat GmbH & Co KG, Konigsbach-Stein, Germany

[21] Appl. No.: 275,168

[22] Filed: Jul. 14, 1994

[30] Foreign Application Priority Data

Jul. 15, 1993 [DE] Germany .......................... 43 23 736.3

[51] Int. Cl.⁶ ...................................................... B66C 1/00
[52] U.S. Cl. ...................... 414/733; 414/788.4
[58] Field of Search ................... 414/733, 788.4, 414/744.5; 901/21

[56] References Cited

U.S. PATENT DOCUMENTS

| | | | |
|---|---|---|---|
| 2,948,417 | 8/1960 | Haanes | 414/733 |
| 3,750,490 | 8/1973 | Fisher | 414/733 X |
| 4,056,198 | 11/1977 | Boserup | . |
| 4,897,015 | 1/1990 | Abbe et al. | 414/744.8 |
| 5,017,083 | 5/1991 | Sahlin | 414/744.5 X |
| 5,046,992 | 9/1991 | Tamai et al. | 474/84 |

FOREIGN PATENT DOCUMENTS

| | | |
|---|---|---|
| 0076947 | 4/1983 | European Pat. Off. . |
| 2593106 | 7/1987 | France . |
| 2802738 | 7/1979 | Germany . |
| 3525988 | 1/1987 | Germany . |
| 3913655 | 10/1990 | Germany . |
| 9220495 | 11/1992 | WIPO . |

*Primary Examiner*—Donald W. Underwood
*Attorney, Agent, or Firm*—Claude A. S. Hamrick

[57] ABSTRACT

A handling apparatus can be used with particular advantage as a pallet moving apparatus, and includes a machine frame with an extension arm, movable in the vertical direction and in the horizontal direction, on which is provided an engaging element for receiving a gripping device. The extension arm has a first rocker element that is mounted on the machine frame and is driven rotatably about a horizontal rotation axis, and at its free end a second rocker element is arranged rotatably and is positively coupled to the first rocker element via a linkage in such a way that when the first rocker element rotates, the engaging element describes a locus curve with largely linear horizontal and vertical sections. Preferably the two rocker elements are positively coupled in such a way that an imaginary rotation of the first rocker element through 360 degrees results in a substantially square locus curve in a vertical plane. The apparatus requires only one NC axis in order to be able to arrive at every point on the locus curve, and is of simple and space-saving construction.

23 Claims, 3 Drawing Sheets

HANDLING APPARATUS

BACKGROUND OF THE INVENTION

The field of the invention relates to a handling apparatus. In particular, the invention relates to an equipment handling apparatus such as a pallet mover, with a machine frame and with an extension arm, movable in the vertical direction, on which is provided an engaging element for engaging a workpiece or another object to be handled.

A conventional handling apparatus, as exemplified by U.S. Pat. No. 4,362,454, includes a gantry, on which a carriage can be displaced in controlled fashion in the horizontal direction. Provided on the carriage are gripping elements that can be displaced in the vertical direction, by means of which individual pallets can be grasped, displaced in the vertical direction, displaced in the horizontal direction along the gantry by displacement of the carriage, and lastly set back down in the vertical direction.

An apparatus of a similar type is exemplified by German patent document DE-C-3 151 316. In such conventional handling apparatus, two controlled axes (NC axes) are needed in order to grasp pallets, displace them in the horizontal direction, and then set them back down. Such conventional handling apparatus have proven disadvantageous because they are relatively complex and costly. If, on the other hand, transport is to occur by means of only one NC axis, corresponding additional devices must be provided so that the pallets can be set down with the necessary accuracy, for which purpose ratchet devices, for example, can be provided. Such additional devices are, however, relatively complex and costly.

Furthermore, conventional handling apparatus which are suitable for pallet moving require a considerable amount of space, since in each case a gantry is required and accessible working space must be located within the gantry.

Yet another conventional handling apparatus is exemplified in DE 2,802,738 A1. This apparatus comprises two rocker elements which are arranged pivotally with respect to one another and which are positively coupled by a transmission for effecting a rotation of the second rocker element at a certain angular rate when the first angular rocker element is rotated at a fixed angular rate.

Such conventional apparatus allow an object to move along a locus curve, or locus of points defining a curve, in a horizontal plane, for instance, to feed a workpiece to a machine tool. However, the known apparatus do not disclose how the transmission between the two rocker elements must be designed in order to attain a locus curve having the shape of a square or a part thereof. In particular, conventional handling methods fail to disclose or to suggest any design principles which could be employed to obtain largely straight sections along such a locus curve. Furthermore, conventional apparatus do not allow for movement along a locus curve having horizontal and vertical sections.

For the foregoing reasons there is a need for a handling apparatus, which could be particularly suitable as a pallet moving apparatus, in which a single NC axis is sufficient to handle workpieces, especially pallets, in both the horizontal direction and vertical direction along largely straight lines. What is also needed is an apparatus which is as simple and space-saving as possible.

There is also a need for a handling apparatus which is capable of engaging a workpiece, a pallet or any other object and moving it along a locus curve having largely the shape of a square or a part thereof; that is, a locus curve which may have large linear horizontal and vertical segments or sections.

SUMMARY

The present invention is directed to a handling apparatus which satisfies the foregoing needs. According to an aspect of the invention, a handling apparatus is provided for moving an engaging element along a locus curve, in which the apparatus comprises a machine frame, a first rocker element arranged on the machine frame rotatable about a first horizontal axis, a second rocker element arranged on one end of the first rocker element, opposite the first horizontal axis, and rotatable about a second horizontal axis, wherein the second rocker element carries the engaging element at an end opposite the second horizontal axis, and wherein a linkage is provided which couples the first and second rocker elements for rotation with a fixed transmission ratio which is for example, on the order of 1:4.

Thus, according to this aspect of invention, the superposition of two rotary motions is utilized to generate a linear motion in both the horizontal and the vertical direction.

Although the foregoing principle is fundamentally known in robotics, at least two NC axes always must be provided, both of which must be controlled so as to generate the desired straight-line motion. According to an aspect of the invention, however, the desired linear motion is derived from two rotary motions, in particular, by the fact that the two rocker elements are positively coupled in a suitable manner by means of a linkage.

According to an aspect of the invention, it is thereby possible to arrive in a controlled manner at any point on a given path of travel or trajectory by means of only one NC axis.

It is also known in robotics to arrange rotation axes fundamentally in such a way that rotary motions occur only in the horizontal direction, since additional loads on the articulation structure due to the weight of the pivotable elements, and inertia during starting and braking, are thereby eliminated.

The invention deviates from this conventional principle, however, and provides for motion of the two rocker elements in the vertical direction, so as to allow, by means of only one controlled NC axis, a motion along a trajectory or path of travel that has both horizontal segments as well as vertical segments.

Further advantages of the present invention result from the fact that a gantry can be entirely omitted, and a single extension arm with two rocker elements is sufficient to perform the necessary motions. The size and weight of the apparatus according to the invention are thereby considerably reduced. The work space of the workpieces or pallets that can be handled with the apparatus according to the invention is not, as with conventional handling apparatus, overlapped by parts of the apparatus itself. This allows utilization even under tightly confined space conditions.

In accordance with another advantageous aspect of the invention, the two rocker elements are positively coupled in such a way that when the first rocker element rotates, the engaging element describes a substantially U-shaped or L-shaped locus curve in a vertical plane.

The advantage of this feature is that the substantially U-shaped trajectory of the engaging element, or of a gripping device provided thereon, is particularly suitable for moving pallets. In this context, pallets must be picked up and moved upward in a vertical direction, then must be moved a predetermined distance in the horizontal direction, and lastly must be moved linearly downward in the vertical direction with high precision and set down again. If the first rocker element makes one complete rotation through 360 degrees, the locus curve approximates to a square. If the rotation of the first rocker element is less than 360 degrees, however, and if it is then cycled back, the result is a substantially U-shaped locus curve, the two arms of the U being directed downward.

For individual applications such as, for example, bundling units for small packaging machines, a different segment of the square shaped trajectory, for example an L-shaped trajectory, can be used.

In a further aspect of the invention, the engaging element is rotatably mounted on the second rocker element, its center axis being arranged parallel to the rotation axis of the first rocker element; and the engaging element is positively coupled to the first rocker element via a second linkage in such a way that as the first rocker element rotates, its angular position with reference to the machine frame remains unchanged.

This ensures that as the engaging element moves along the locus curve, it maintains an unchanged angular position, so that a gripping device provided thereon remains, for example, oriented horizontally, in particular when pallets are to be moved. This advantageously can be achieved by the fact that the transmission ratio of the second linkage amounts to 4:3. As a result, the rotation of the engaging element generated at a 1:4 transmission ratio of the first linkage is compensated for by the second linkage.

In a further aspect of the invention, the arm length ratio defined by the quotient of the arm length of the second rocker element—which is defined by the axial spacing between the rotation axis of the second rocker element and the center axis of the coupling device—and the arm length of the first rocker element—which is defined by the axial spacing between the rotation axes of the first and second rocker elements—lies in a range between approximately 0.09 and 0.25.

According to the foregoing aspect of the invention, it has been observed that the linearity of the trajectory is substantially influenced by the arm length ratio. While at very low arm length ratios, linearity can be achieved only on relatively short sections of the trajectory, large deviations from linearity over the entire path occur at greater arm length ratios.

In a further preferred embodiment of the invention, the arm length ratio is set at between approximately 0.11 and 0.16. This range results in a good compromise between the length of the linear segments on the one hand, and the maximum deviation from linear travel on the other hand. It is particularly preferred in this context if the arm length ratio lies in a range between approximately 0.12 and 0.15. Optimum results are obtained when the arm length ratio lies between 0.125 and 0.135.

When the parameters are selected in this manner, and with a stack height of approximately 1.2 meters, i.e. a usable trajectory length in the vertical direction of 1.2 meters, the maximum deviation from linearity over the entire trajectory is a maximum of ±3 mm. Linearity is maintained within this tolerance over the entire trajectory, with slight rounding only in the corner regions of the square trajectory.

With a stack height of approximately 1.2 meters, it is advantageous to set the axial spacing for the first rocker element in the range of 930 to 1000 mm, preferably at approximately 962 mm, while the axial spacing for the second rocker element is set in the range between approximately 122 and 132 mm, preferably at approximately 127 mm.

With a maximum stack height of approximately 870 mm, it is advantageous to set the axial spacing for the first rocker element between approximately 660 and 720 mm, preferably at approximately 692 mm, while the axial spacing for the second rocker element is set in the range between approximately 88 and 96 mm, preferably at approximately 92 mm. If a greater stack height is desired, the axial spacings can be correspondingly increased, while approximately maintaining the arm length ratio.

Correspondingly greater deviations from the linearity of the trajectory result from this, however. Conversely, if the arm length ratio is set somewhat lower, specifically in the approximate range between 0.11 and 0.12, the result is a theoretically optimal value at 0.111. This yields optimum trajectory linearity, although this is maintained only over a relatively short section of the trajectory. While beyond this section, greater deviations from linearity occur. For a lower stack height, the arm length ratio can be set somewhat lower, i.e. closer to the optimum value of 0.111.

In a preferred embodiment of the invention, the first linkage has a first gear fastened to the machine frame, and a second gear mounted rotatably at the free end of the first rocker element, which are coupled by means of a toothed belt or further gears. This advantageously allows the positive drive coupling between the first rocker element and the second rocker element to be achieved in a particularly simple manner.

The change in the angular position of the engaging element caused by the rotary motion of the first rocker element additionally may need to be compensated for. This may be necessary in order to maintain the angular position of the engaging element with reference to the machine frame as the rocker elements move. To accomplish this, an embodiment of the invention advantageously provides a second linkage which has a third gear, rigidly joined to the first rocker element. The third gear is coupled by means of a toothed belt to a fourth gear that is rigidly joined to the engaging element, and also may be coupled to a fifth gear, or further gears. In this way, the required compensatory motion to maintain the angular position of the engaging element advantageously is achieved with particularly simple means.

In a further aspect of the invention, the handling apparatus can be used as a pallet moving apparatus. It would then require only one NC axis, which is the rotation axis of the first rocker element.

It is understood that the features mentioned above and those yet to be explained below can be used not only in the respective combinations indicated, but also in other combinations or in isolation, without departure from the context of the present invention.

Further aspects and advantages of the invention are evident from the description below of a preferred exemplary embodiment of the invention, with reference to the drawings.

DETAILED DESCRIPTION

Figure 1:
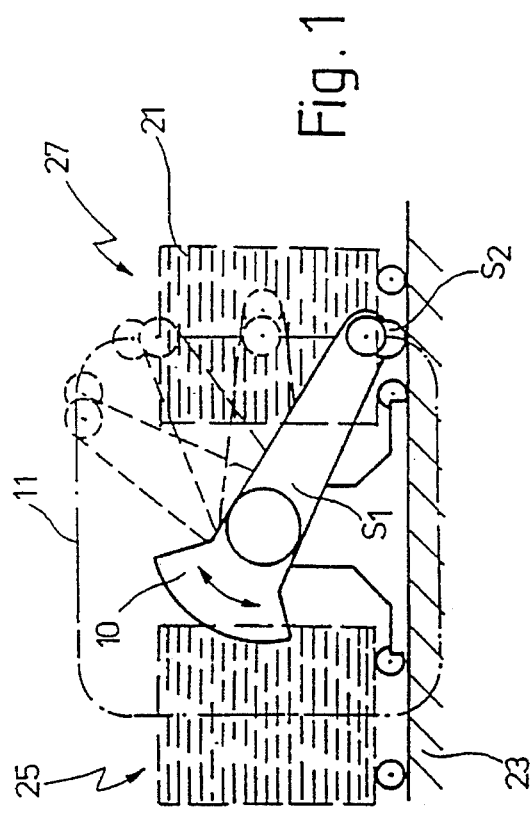
FIG. 1 shows a general view of an apparatus according to the invention, illustrating the motion sequence.
Figure 2:
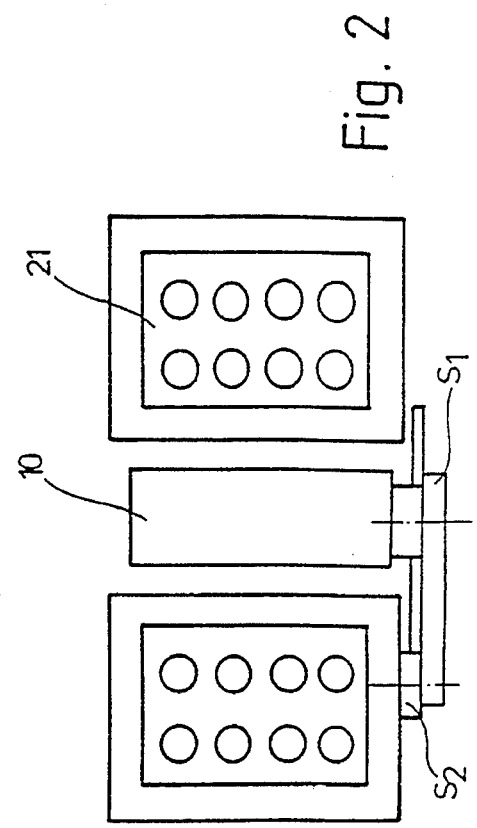
FIG. 2 shows a simplified schematic plan view of the apparatus according to FIG. 1 after the extension arm has rotated into an opposite end position.

Referring to FIGS. 1 and 2, a handling apparatus according to the invention is depicted, using the example of a pallet moving apparatus 10.

The apparatus 10 stands on a base 23 and is used to move pallets, which are indicated schematically by 21, and are moved between two adjacent stacks 25 and 27. For example, stack 25 may contain a stock of unprocessed workpieces, of which one pallet in each case is to be placed on the stack 27, from which a loading gantry then loads a machine tool. The handling apparatus 10 has a first rocker element or extension arm S1 at whose free end a second extension arm S2 is arranged rotatably. The extension arms S1, S2 are positively coupled by means of a linkage, in a manner to be depicted below, in such a way that during an imaginary rotation of the first rocker element S1 through 360 degrees, a gripping device provided at the end of the second rocker element S2 describes a substantially square trajectory that is indicated schematically by a dot-dash line 11. It will be appreciated from FIG. 1 that U-shaped curve 11 is represented by a dot-dash line. Each half of U-shape curve 11 comprises an L-shape curve 11(a), 11(b), respectively.

Figure 3:
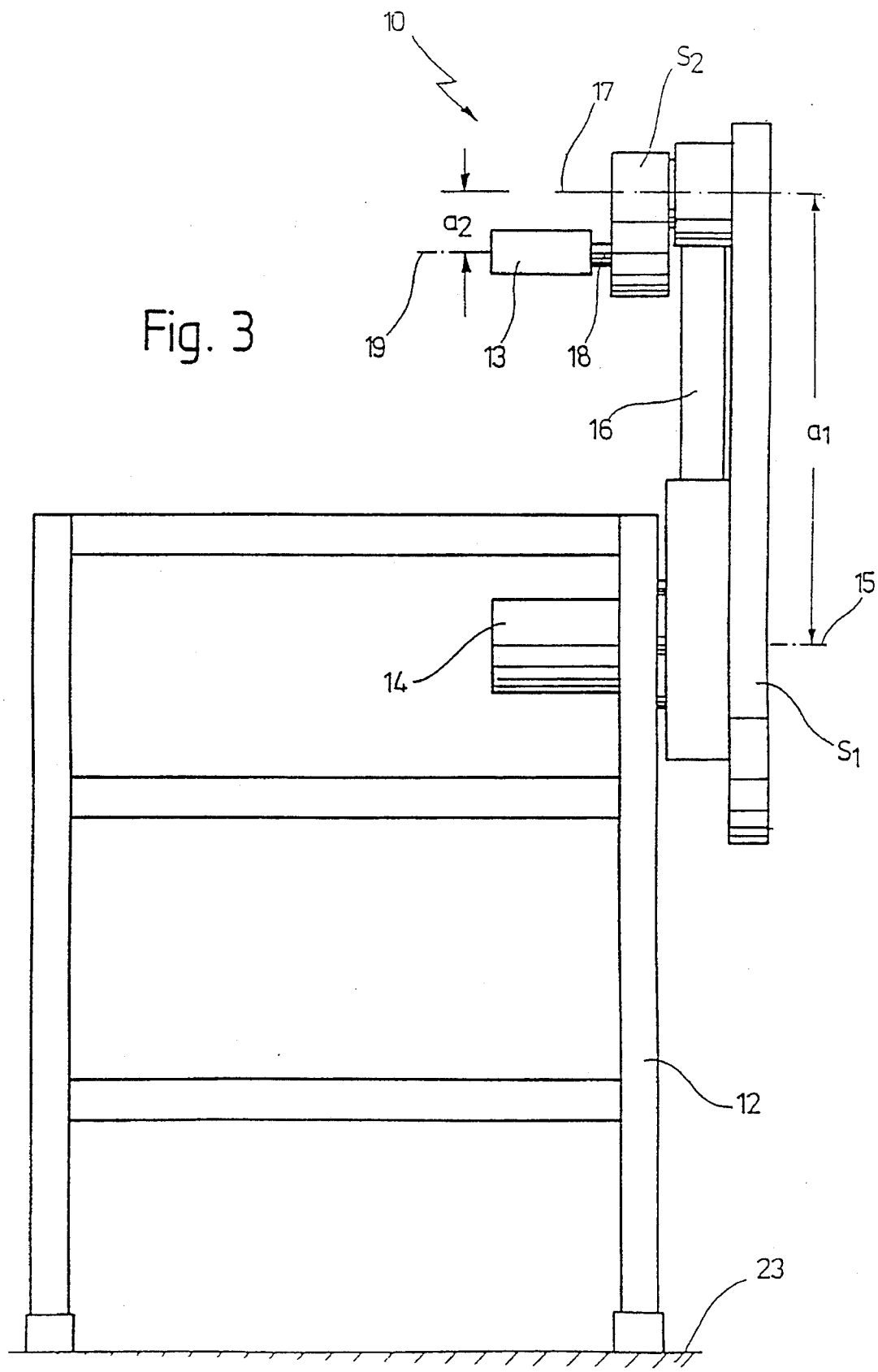
FIG. 3 shows a simplified side view of the apparatus according to the invention.

According to FIG. 3, the handling apparatus 10 has a machine frame 12 on which the first rocker element S1 is mounted so as to rotate about a first horizontal rotation axis 15. Motive means for driving the device are provided by a drive unit 14, including an output shaft which is connected to the first rocker element S1. In a preferred embodiment, the drive unit 14 comprises a rotary drive which rotates the first rocker element S1 controllably about a first rotation axis 15.

At the free end of the first rocker element S1, the second rocker element S2 is rotatably mounted on a second rotation axis 17 that is parallel to the first rotation axis 15. An engaging element 18, which comprises a stub shaft projecting from the second rocker element S2, is also rotatably mounted at the free end of the second rocker element S2. The engaging element 18 carries a gripping device that is indicated schematically in FIG. 3, as element 13.

The first rocker element S1 is positively coupled to the second rocker element S2 via a linkage means such as a toothed belt linkage, or the like. While a toothed belt is depicted in FIG. 3, any convenient means for positively coupling S2 and S1 may be used. The engaging element 18 is positively coupled to the first rocker element S1 via a second linkage that is also not visible in FIG. 3.

Figure 5:
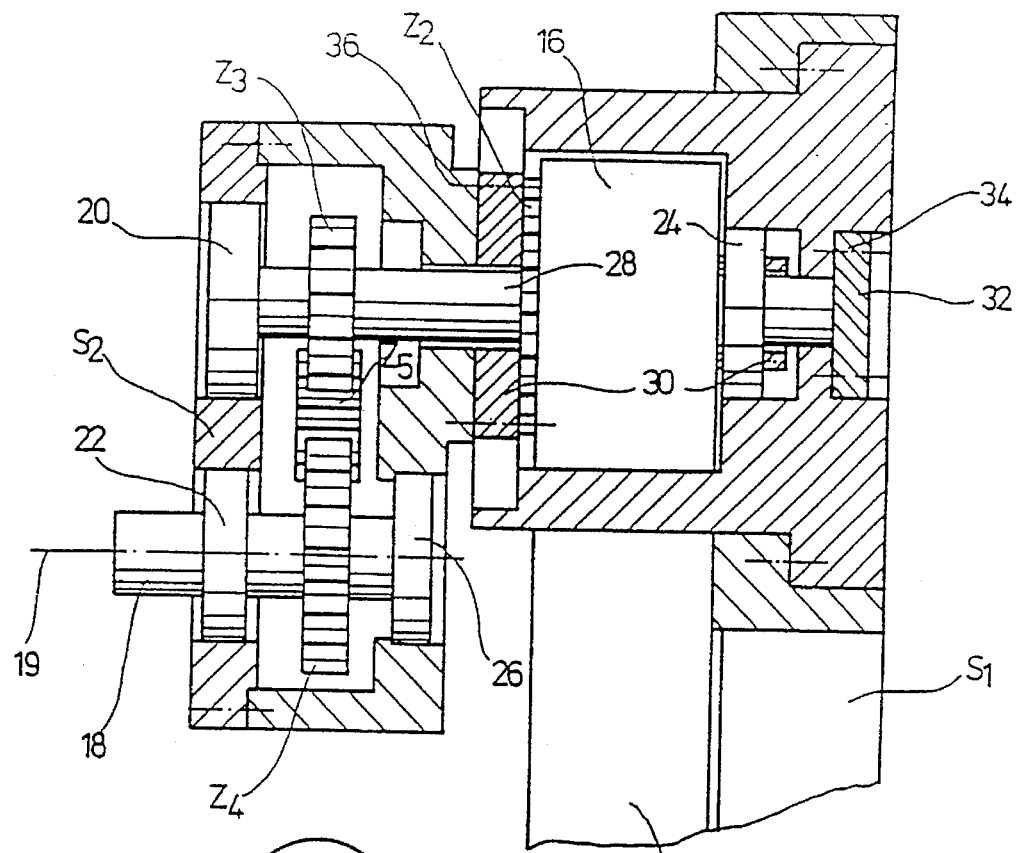
FIG. 5 shows an enlarged section through the free end of the first rocker element according to FIGS. 3 and 4, with the second rocker element provided thereon.
Figure 4:
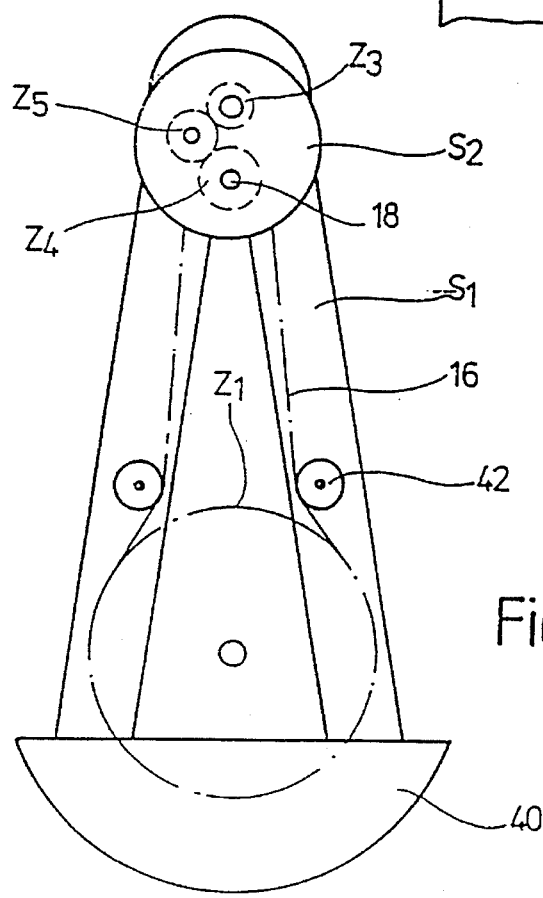
FIG. 4 shows a simplified front view of the extension arm with the two rocker elements of the apparatus according to FIG. 3, depiction of the other elements of the apparatus being omitted for the sake of clarity.

Referring to FIG. 4, the first linkage has a first gear Z1 that is fastened immovably on the machine frame 12. The second gear Z2 of the first linkage, however, is rotatably mounted in the free end of the first rocker element S1 as shown in FIG. 5. A toothed belt 16 is guided over the two gears Z1, Z2 and retained by means of two lateral idler rollers 42. Thus, when the first rocker element S1 is rotated by means of the rotary drive 14, the toothed belt 16 rolls over the stationary gear Z1 and causes the second gear Z2 to rotate.

In order to counterbalance the weight of the arrangement of rocker elements S1, S2 with the associated linkages, in terms of the rotation axis 15, a compensation weight 40 is provided at the end of the first rocker element opposite the second gear Z2. The first rocker element S1 and the second rocker element S2 are connected by a shaft 28 that is rotatably held in the second rocker element S2 by means of a bearing 20, or the like. At its other end, shaft 28 is nonrotatably fastened in the first rocker element S1 by means of a flange 32 and threaded joints 34.

The second gear Z2 is rotatably mounted in the first rocker element S1 by means of a flange 30 through which the shaft 28 passes, and by means of a bearing 24. The second gear Z2 is rigidly connected to the second rocker element S2 by means of the flange 30 using threaded joints 36. Thus, when the second gear Z2 rotates because of the rotation of the first rocker element S1, the second rocker element S2 is thereby simultaneously rotated with respect to the first rocker element S1.

Engaging element 18, which is configured as a stub shaft, is also arranged in the second rocker element S2. Engaging element 18 is disposed parallel to the shaft 28, and rotatably mounted by means of two bearings 22, 26. A third gear Z3 is nonrotatably fastened on the shaft 28. A fourth gear Z4 is also nonrotatably held on the engaging element 18. The third gear Z3 and the fourth gear Z4 are coupled to one another by means of a fifth gear Z5, arranged between them, which meshes with the two gears Z3, Z4. It is understood that the gears Z3, Z4 alternatively could be coupled not only by a further gear, but also by any convenient means for coupling, such as a toothed belt, as in the case of the first linkage.

The transmission ratio i1 of the first linkage is given by the ratio between the numbers of teeth on the first gear Z1 and the second gear Z2 as follows:

$$i1=Z2:Z1=1:4$$

The transmission ratio i2 of the second linkage is given by the ratio between the numbers of teeth on the fourth gear and the third gear:

$$i2=Z4:Z3=4:3$$

In the example depicted, the arm length a1 of the first rocker element S1, which is defined by the spacing between the rotation axes 15, 17, is approximately 692 mm. The arm length a2 of the second rocker element S2, which is given by the spacing of the axes 17, 19, is approximately 92 mm. These dimensions are optimum for a stack height of approximately 870 mm.

The result is an arm length ratio k, defined by the quotient of a2 and a1, that is:

$$k=a2:a1=91:691=0.132$$

This has significance as a design parameter for the kinematics of the handling apparatus 10 according to the invention. The significance of this design parameter will be explained below with reference to the equivalent kinematic system according to FIG. 6.

Figure 6:
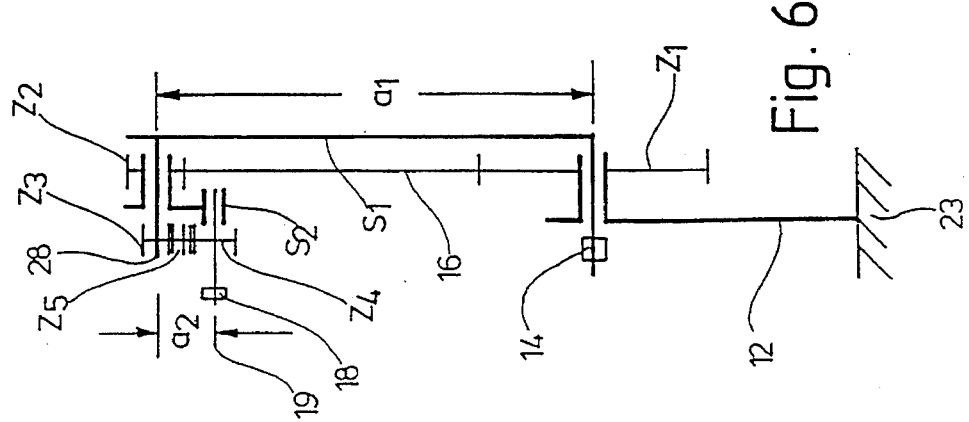
FIG. 6 shows a kinematic equivalent system for the apparatus according to the invention.

Referring now to FIG. 6, the machine frame 12 is fastened immovably on the base 23. The first rocker element S1, which is driven by the output flange of the rotary drive 14, is rotatably mounted on the machine frame 12. The second rocker element S2 is rotatably mounted on the free end of the first rocker element S1. The first gear Z1 is fastened immovably on the machine frame 12, and connected to the second gear Z2, which is mounted rotatably on the first rocker element by means of the toothed belt 16. The second gear Z2 is directly connected to the second rocker element S2 and thus drives the rocker element S2 when the first rocker element S1 is rotated.

The shaft 28 is rigidly fastened on the first rocker element S1. Shaft 28 is also nonrotatably joined to the gear Z3. The gear Z3 is coupled to the fourth gear Z4, which is nonrotatably fastened on the engaging element 18 by means of the fifth gear Z5. Engaging element 18 is configured as a rotatable stub shaft.

When the first rocker element S1 is rotated at an angular velocity $\omega 1$, the center axis 19 of the engaging element 18 moves at an angular velocity $\omega 2$ which is given by the transmission ratio i1; that is $\omega 2 = 4\, \omega 1$ in the opposite direction.

In order to keep the angular position of the engaging element 18 constant with reference to the base 23 and machine frame 12, the rotation of the engaging element 18 caused by the two superimposed rotary motions must be compensated for. For this purpose the transmission ratio i2 is set at 4:3.

The exemplary embodiment shown in FIGS. 3 through 5 is embodied as a pallet moving apparatus, which can be used to stack pallets up to a stacking height of approximately 0.87 m.

The arm length ratio k is defined as k=0.132, since this produces good linearity for the trajectory of the engaging element. Also, rounding of the trajectory occurs essentially only in the outermost corner regions, as indicated in FIG. 1 by the dot-dash line 11.

With the design parameters selected, linearity advantageously is maintained with high accuracy over a range of approximately 0.75 meters. Only in the corner regions, i.e. as the trajectory transitions from the horizontal movement into the vertical movement and vice versa, is a larger tolerance reached in the last 5 cm before the transition. It is in this transition region that the trajectory takes on an inwardly rounded course. Since the rocker element S1 is not pivoted completely through 360 degrees, but simply cycles back and forth alternately between the two stacks 25, 27, the pivot angle is only approximately 270 degrees, and the trajectory described by the engaging element 18 does not have an approximately square shape, but corresponds to a U whose two arms point downward.

According to an aspect of the invention, it is seen that the arm length ratio can be varied, preferably in a range between 0.09 and 0.2. However, a better compromise between linearity of the trajectory and maintenance of linearity even in the corner regions occurs when the arm length ratio is in a range between 0.11 and 0.16.

Also, it is further preferable that an arm length ratio should be in a range between 0.12 and 0.15. However, for most applications, optimum results are produced in a range between 0.125 and 0.135. In the example selected, an arm length ratio of approximately 0.132 was set; and arm lengths of 692 mm and 92 mm were used to make possible a stack height of approximately 0.87 m.

If a greater stack height, for example approximately 1.50 m, needs to be attained, the arm length ratio can be maintained while the arm lengths are simply increased correspondingly. Of course, the linearity deviations of the trajectory then also will increase correspondingly. If a lower stack height is required, for example only 60 cm, as in cases where an apparatus according to the invention is to be used for other purposes, such as for bundling units of small packaging machines, the arm length ratio can then be set somewhat lower, approximately in the range between 0.12 and 0.13. This range results in even better linearity and only slight deviations in the corner regions of the trajectory.

The apparatus according to the invention can be used with particular advantage not only as a pallet mover for loading machine tools, but for other applications as well. An apparatus of this kind also can be used with equal advantage in small machines, for example, in compact bundling units or packaging apparatus for small packaging machines. In this connection any desired segments of a square form can be selected as trajectories. Thus, in addition to U-shaped trajectories, L-shaped trajectories, for example, also can be realized.

While the invention has been described in connection with what is presently considered to be the most practical and preferred embodiments, it is to be understood that the invention is not limited to the disclosed embodiments but, on the contrary is intended to cover various modifications and equipment arrangements included within the spirit and scope of the appended claims.

What is claimed is:

1. Handling apparatus for moving an object along a U-shaped locus curve, said apparatus comprising:

an engaging element for engaging the object;

a machine frame;

a first rocker element disposed on said machine frame for rotation about a first horizontal axis;

a second rocker element disposed on one end of said first rocker element opposite said first horizontal axis for rotation about a second horizontal axis, said second rocker element carrying said engaging element at an end opposite said second horizontal axis; and a first linkage coupling said first and second rocker elements for rotation with a fixed transmission ratio;

wherein said transmission ratio of said first linkage is substantially 1:4 to effect movement of said engaging element, as said first rocker element is rotated about said first horizontal axis, along the U-shaped locus curve having at least one horizontal section and one vertical section, and said horizontal and said vertical sections are largely straight;

wherein an arm length ratio (k) defined by a quotient of an arm length (a2) of said second rocker element—which is defined by an axial spacing between said second horizontal axis and a center axis of said engaging element—and an arm length (a1) of said first rocker element—which is defined by an axial spacing between said first and second horizontal axis—lies in the range between substantially 0.09 and 0.25 such that:

$$0.09 <= k = a2/a1 <= 0.25.$$

2. Handling apparatus according to claim 1, wherein said engaging element describes a substantially U-shaped locus curve in a vertical plane when said first rocker element is rotated about said first horizontal axis.

3. Handling apparatus according to claim 1, wherein said engaging element is rotatably mounted on said second rocker element, having a center axis being arranged parallel to said first horizontal axis, and wherein said engaging element is positively coupled to said first rocker element via a second linkage in such a way that as the first rocker element rotates, its angular position with reference to the machine frame remains unchanged.

4. Handling apparatus according to claim 3, wherein said second linkage has a transmission ratio of substantially 4:3.

5. Handling apparatus according to claim 1, wherein the arm length ratio lies between approximately 0.11 and 0.16.

6. Handling apparatus according to claim 1, wherein the arm length ratio lies between approximately 0.12 and 0.15.

7. Handling apparatus according to claim 1, wherein the arm length ratio lies between approximately 0.125 and 0.135.

8. Handling apparatus according to claim 1, wherein the arm length of said first rocker element lies approximately between 660 and 720 mm, while the arm length of said second rocker element lies between approximately 88 and 95 mm.

9. Handling apparatus according to claim 6, wherein the arm length of said first rocker element lies approximately between 930 and 1,000 mm, while the arm length of said second rocker element lies between approximately 122 and 132 mm.

10. A palletting apparatus for engaging pallets and for moving them along a U-shaped locus curve in a vertical and horizontal direction, said apparatus comprising:

an engaging element;

a machine frame;

a first rocker element arranged on said machine frame rotatably about a first horizontal axis;

a second rocker element arranged on one end of said first rocker element opposite said first horizontal axis for rotation about a second horizontal axis, said second rocker element carrying said engaging element at an end opposite said second horizontal axis for moving a pallet in a U-shaped locus curve; and a first linkage coupling said first and second rocker elements for rotation with a fixed transmission ratio;

wherein said transmission ratio of said first linkage is 1:4 to effect movement of said engaging element along a U-shaped locus curve, as said first rocker element is rotated about said first horizontal axis along the U-shaped locus curve having at least one horizontal section and one vertical section, both said horizontal and said vertical sections being largely straight; and wherein an arm length ratio (k) defined by a quotient of an arm length (a2) of said second rocker element— which is defined by an axial spacing between said second rotation axis and said center axis of said engaging element—and an arm length (a1) of said first rocker element—which is defined by an axial spacing between said first and second rotation axis—lies in the range between substantially 0.09 and 0.25 such that:

$$0.09 <= k = a2/a1 <= 0.25.$$

11. Handling apparatus according to claim 3, wherein said first linkage comprises a first gear fastened to the machine frame, and a second gear mounted rotatably on said first rocker element, both gears being coupled by one of the following: a toothed belt and further gears.

12. Handling apparatus according to claim 11, wherein said second linkage comprises a third gear, rigidly joined to said first rocker element, that is coupled to a fourth gear that is rigidly joined to said engaging element by a coupling means selected from the group consisting of: a toothed belt and a fifth gear.

13. Handling apparatus for moving an object along a locus curve having at least one L-shaped segment, said apparatus comprising:

an engaging element for engaging, the object;

a machine frame;

a first rocker element disposed on said machine frame for rotation about a first horizontal axis;

a second rocker element disposed on one end of said first rocker element opposite said first horizontal axis for rotation about a second horizontal axis, said second rocker element carrying said engaging element at an end opposite said second horizontal axis; and a first linkage coupling said first and second rocker elements for rotation with a fixed transmission ratio;

wherein said transmission ration of said linkage is substantially 1:4 to effect movement of said engaging element, as said first rocker element is rotated about said first horizontal axis, along the L-shaped locus curve having at least one horizontal section and one vertical section, and said horizontal and said vertical sections are largely straight;

wherein an arm length ratio (k) defined by a quotient of an arm length (a2) of said second rocker element— which is defined by an axial spacing between said second horizontal axis and a center axis of said engaging element—and an arm length (a1) of said first rocker element—which is defined by an axial spacing between said first and second horizontal axis—lies in the range between substantially 0.09 and 0.25 such that:

$$0.09 <= k = a2/a1 <= 0.25.$$

14. Handling apparatus according to claim 13, wherein said engaging element describes a substantially L-shaped locus curve in a vertical plane when said first rocker element is rotated about said first horizontal axis.

15. Handling apparatus according to claim 13, wherein said engaging element is rotatably mounted on said second rocker element, having a center axis being arranged parallel to said first horizontal axis, and wherein said engaging element is positively coupled to said first rocker element via a second linkage in such a way that as the first rocker element rotates, its angular position with reference to the machine frame remains unchanged.

16. Handling apparatus according to claim 15, wherein said second linkage has a transmission ratio of substantially 4:3.

17. Handling apparatus according to claim 13, wherein the arm length ratio lies between approximately 0.11 and 0.16.

18. Handling apparatus according to claim 13, wherein the arm length ratio lies between approximately 0.12 and 0.15.

19. Handling apparatus according to claim 13, wherein the arm length ratio lies between approximately 0.125 and 0.135.

20. Handling apparatus according to claim 13, wherein the arm length of said first rocker element lies approximately between 660 and 720 mm, while the arm length of said second rocker element lies between approximately 88 and 95 mm.

21. Handling apparatus according to claim 13, wherein the arm length of said first rocker element lies approximately between 930 and 1,000 mm, while the arm length of said second rocker element lies between approximately 122 and 132 mm.

22. Handling apparatus according to claim 15, wherein said first linkage comprises a first gear fastened to the machine frame, and a second gear mounted rotatably on said first rocker element, both gears being coupled by one of the following: a toothed belt and further gears.

23. Handling apparatus according to claim 22, wherein said second linkage comprises a third gear, rigidly joined to said first rocker element, that is coupled to a fourth gear that is rigidly joined to said engaging element by a coupling means selected from the group consisting of: a toothed belt and a fifth gear.

* * * * *